(12) United States Patent
Thomsen et al.

(10) Patent No.: US 10,927,822 B2
(45) Date of Patent: Feb. 23, 2021

(54) FRAME FOR CARRYING A LOAD IN A WIND TURBINE

(71) Applicant: Vestas Wind Systems A/S, Aarhus N. (DK)

(72) Inventors: Kristoffer Isbak Thomsen, Århus N (DK); Anders Haslund Liingaard, Hinnerup (DK); Thomas Rugård Poulsen, Solbjerg (DK); Christian Bovenkamp, Østbirk (DK)

(73) Assignee: Vestas Wind Systems A/S, Aarhus N. (DK)

( * ) Notice: Subject to any disclaimer, the term of this patent is extended or adjusted under 35 U.S.C. 154(b) by 113 days.

(21) Appl. No.: 16/310,997

(22) PCT Filed: Jun. 23, 2017

(86) PCT No.: PCT/DK2017/050207
§ 371 (c)(1),
(2) Date: Dec. 18, 2018

(87) PCT Pub. No.: WO2018/001428
PCT Pub. Date: Jan. 4, 2018

(65) Prior Publication Data
US 2019/0178232 A1 Jun. 13, 2019

(30) Foreign Application Priority Data

Jun. 27, 2016 (DK) .............................. PA2016 70459

(51) Int. Cl.
*F03D 80/80* (2016.01)
*F03D 13/20* (2016.01)
(Continued)

(52) U.S. Cl.
CPC ............. *F03D 80/80* (2016.05); *F03D 13/20* (2016.05); *F03D 80/00* (2016.05); *F03D 1/065* (2013.01);
(Continued)

(58) Field of Classification Search
CPC .......... F03D 1/065; F03D 13/20; F03D 80/00; F03D 80/80; F03D 80/88; E04B 1/18;
(Continued)

(56) References Cited

U.S. PATENT DOCUMENTS

| | | | |
|---|---|---|---|
| 5,044,828 A | 9/1991 | Berner, Jr. et al. | |
| 6,892,504 B1 * | 5/2005 | diGirolamo | E04B 1/08 52/167.3 |

(Continued)

FOREIGN PATENT DOCUMENTS

| | | |
|---|---|---|
| DE | 102008046210 A1 | 3/2010 |
| WO | 2010069315 A2 | 6/2010 |
| WO | 2012159046 A2 | 11/2012 |

OTHER PUBLICATIONS

Danish Patent and Trademark Office, Search and Examination Report in PA 2016 70459, dated Jan. 25, 2017.
(Continued)

*Primary Examiner* — Courtney D Heinle
*Assistant Examiner* — Sang K Kim
(74) *Attorney, Agent, or Firm* — Wood Herron & Evans LLP

(57) ABSTRACT

The invention is a frame for carrying a load in a wind turbine. The frame comprises a first and a second beam extending in a lengthwise direction, a third beam extending in a transverse direction between a first joint on the first beam and a second joint on the second beam. The third beam is configured for carrying the load. The frame further comprises a stress-inducing cross-shaped structure forming
(Continued)

four legs joined at an intersection and extending therefrom towards four ends, where two of the four ends are attached on opposite sides of the joint on the first beam and the other two of the four ends are attached on opposite sides of the joint on the second beam. To prevent excessive deflection of the third beam and of the cross-shaped structure, the cross-shaped structure is decoupled from the third beam and therefore allowed to move e.g. without touching the third beam.

12 Claims, 4 Drawing Sheets

(51) Int. Cl.
*F03D 80/00* (2016.01)
*F03D 1/06* (2006.01)

(52) U.S. Cl.
CPC ...... *F05B 2240/14* (2013.01); *F05D 2240/14* (2013.01); *Y02E 10/728* (2013.01)

(58) Field of Classification Search
CPC .. E04B 1/24; E04B 1/2403; E04B 2001/2457; Y02E 10/726; B64C 1/061; B64C 1/08

USPC .......... 52/657, 693, 695; 244/123.7
See application file for complete search history.

(56) References Cited

U.S. PATENT DOCUMENTS

| | | | |
|---|---|---|---|
| 8,393,118 B2* | 3/2013 | Fang | E04H 12/10 52/167.1 |
| 2008/0086963 A1* | 4/2008 | Proffitt, Jr. | E04B 2/58 52/223.6 |
| 2011/0204649 A1* | 8/2011 | Segovia | F03D 80/00 290/55 |
| 2016/0160843 A1 | 6/2016 | Jensen | |
| 2019/0127969 A1* | 5/2019 | Petersen | E04B 1/40 |

OTHER PUBLICATIONS

European Patent Office, International Search Report and Written Opinion in PCT Application No. PCT/DK2017/050207, dated Sep. 18, 2017.

* cited by examiner

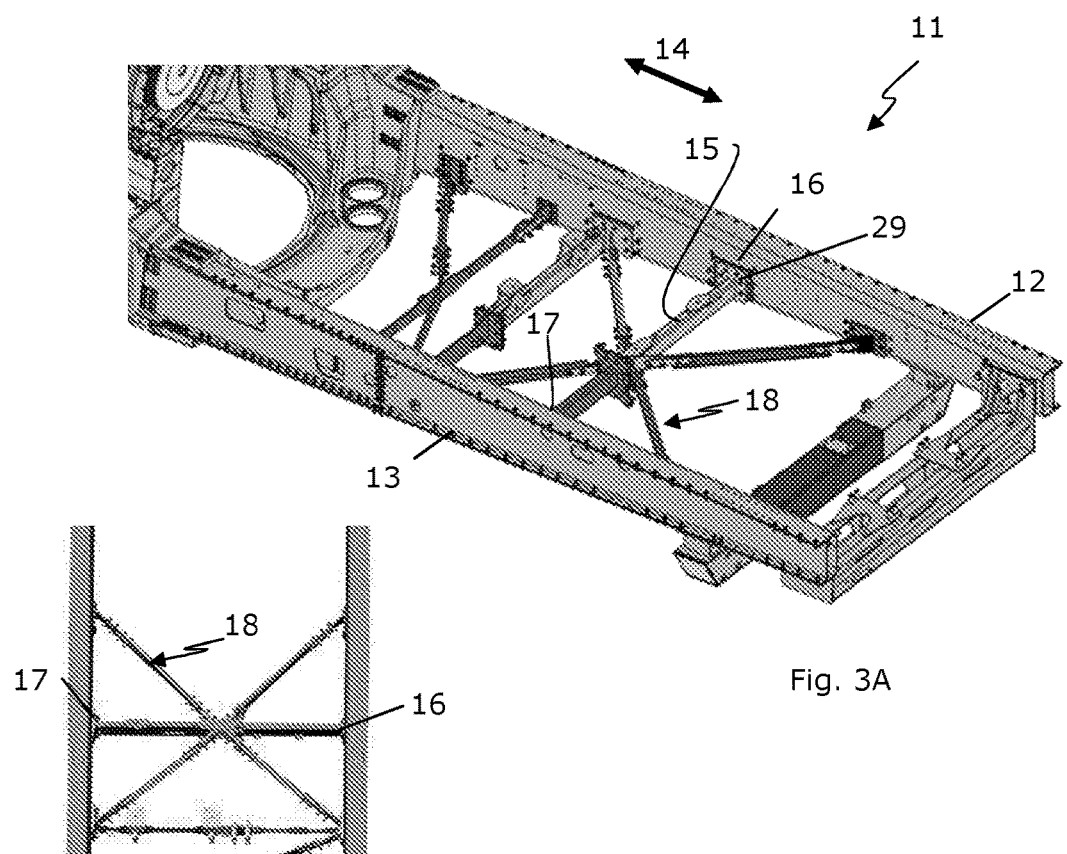
Fig. 3A
Fig. 3B
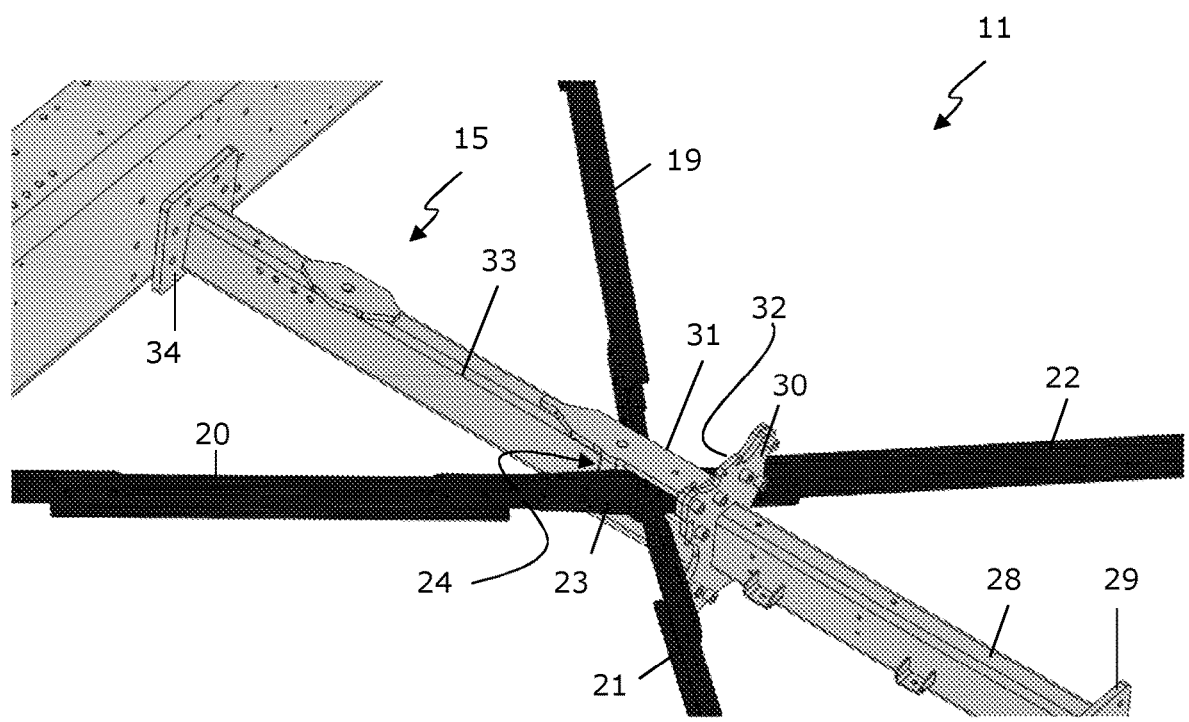
Fig. 4

FRAME FOR CARRYING A LOAD IN A WIND TURBINE

BACKGROUND OF THE INVENTION

The invention relates to a frame for carrying a load in a wind turbine.

Wind turbines comprise a rotor with blades. The rotor is typically carried by a nacelle and rotates a drive train in the nacelle. By wind energy, the rotor is rotated, and the energy is converted e.g. to electrical energy by a generator which is rotated by the drive train. The wind energy induces loading of the turbine in general and torque in the drive train.

Various components in the nacelle is carried by a frame, typically a frame which is assembled from steel beams or moulded steel components. Examples of such components are the generator, a gearbox, the drive shaft connecting the rotor with the gearbox or generator, and various electronic components, e.g. power converters or control systems for controlling operation of the wind turbine.

The frame carries the static weight of the component and the dynamically changing loading induced by the wind. Since the nacelle is typically arranged in high altitude at a top end of a tower, not only strength but also weight is of great importance.

DESCRIPTION OF THE INVENTION

It is an object of the invention to improve frames for carrying components in a wind turbine, and particularly to ensure a cost efficient load path in wind turbine frames. It is a further object to reduce weight of wind turbine frames, and to facilitate less stress and fatigue.

In accordance with these and other objects, embodiments of the invention, in a first aspect, provides a frame for carrying a load in a wind turbine. The frame according to the invention comprises:
  a first and a second beam extending in a lengthwise direction,
  a third beam extending in a transverse direction between a first joint on the first beam and a second joint on the second beam, the third beam configured for carrying the load, and
  a stress-inducing cross-shaped structure forming four legs joined at an intersection and extending therefrom towards four ends, where two of the four ends are attached on opposite sides of the joint on the first beam and the other two of the four ends are attached on opposite sides of the joint on the second beam.

To reduce loading of the third beam or of the cross-shaped structure and thus to prevent deformation and fatigue, the influence of stress in the third beam on the cross-shaped structure and the influence of stress in the cross-shaped structure on the third beam is prevented by decoupling the third beam from the cross-shaped structure.

By decoupling is herein meant that the cross-shaped structure induces no load on the third beam and that the third beam induces no load on the cross-shaped structure. That is enabled e.g. by a structure where the cross-shaped structure is not in contact with the third beam. In another example, the decoupling may be enabled by joining the third beam and the cross-shaped structure in a joint allowing sliding and/or rotation of the cross-shaped structure relative to the third beam, e.g. a joint with a low friction material facilitating the movement between the cross-shaped structure and the third beam.

By decoupling the cross-shaped structure from the third beam, bending of the third beam due to loading resulting from the weight or torque of the component does not influence the cross-shaped structure and as a result, the cross-shaped structure may be designed differently. Particularly, the invention allows the design of a cross-shaped structure essentially exclusively capable of counteracting tension but not compression. This provides an increased flexibility, weight reduction, and a reduced cost for the components and for the assembly of the wind turbine.

The cross-shaped structure may be configured exclusively to counteract tension and not to withstand compression. As an example, the legs of the cross-shaped structure may be constituted by cables or robes, and in another example, the entire cross-shaped structure is constituted by cables or robes.

The third beam may form an opening through which the cross-shaped structure extends. The opening may e.g. be a through hole having a closed peripheral edge, and the through hole may be sufficiently large for the cross-shaped structure to extend through the hole without touching the third beam. In another example, the third beam forms a recess or indentation through which the cross-shaped structure extends.

As an alternative to the third beam forming an opening, the cross-shaped structure may form an opening through which the third beam extends. The opening may e.g. be a through hole having a closed peripheral edge, and the through hole may be sufficiently large for the third beam to extend through the hole without touching the cross-shaped structure. In another example, the cross-shaped structure forms a recess or indentation through which the third beam can extends.

The third beam extends between upper and lower edges in a height direction perpendicular to the lengthwise direction and perpendicular to the transverse direction. With this definition, the cross-shaped structure may be crossing the third beam at a junction located between the upper and lower edges. Accordingly, the cross-shaped structure and the third beam extend in the same plane.

The cross-shaped structure and the third beam may be located relative to each other such that the intersection is at the junction.

The size of the third beam in the height direction may be larger than the size of the cross-shaped structure in the height direction. This facilitates the cross-shaped structure can extend through a closed hole in the third beam. As an example, the third beam may have a size of at least 1.5 times the size of the cross-shaped structure or even a size of more than 2 or 3 times the size of the cross-shaped structure in the height direction.

The size of the first and second beam in the height direction could be larger than the size of the third beam in the height direction. This facilitates that the cross-shaped structure stiffens a first and second beam structure which is relatively strong compared to the third beam. As an example, the first and second beams may have a size of at least 1.5 times the size of the third beam or even a size of more than 2 or 3 times the size of the third beam in the height direction.

The cross-shaped structure may be assembled from separate structure elements joined at the junction. This facilitates an easier assembly, not least in combination with the embodiment in which the cross-shaped structure extends through a hole in the third beam. In one such embodiment, the intersection of the cross-shaped element is constituted by one centre element and each of the four legs is separate elements attached to the centre element.

The third beam could be assembled from separate beam elements, e.g. joined at the junction. This facilitates an easier assembly, not least in combination with the embodiment in which the cross-shaped structure forms a hole through which the third beam extends. In one such embodiment, the third beam forms a beam-centre element and two legs attached to the beam-centre element and extending therefrom towards the first and second joint.

In one embodiment, the transverse direction is perpendicular to the lengthwise direction.

In one embodiment, the legs of the cross-shaped structure all extend at the same angle to the first and second beam, e.g. an angle between 30 and 60 degrees such as 45 degrees.

In a second aspect, the invention provides a wind turbine comprising a nacelle carrying a frame according to the first aspect of the invention. The wind turbine further comprises a wind driven rotor, and a drive train which is driven by the rotor. The drive train includes a generator which is carried by the third beam of the frame.

At least the first and second beams, and optionally also the third beam and/or the cross-shaped structure may further carry other components of the drive train, e.g. a gearbox, a bearing holding the drive shaft, electronic components such as a controller, a power converter and other equipment in the nacelle.

In a third aspect, the invention provides a method of suspending a component in a wind turbine by use of the frame according to the first aspect. According to this method, the component, particularly a generator, is arranged on the third beam, and the third beam is allowed to deflect without influencing the cross-shaped structure.

DETAILED DESCRIPTION OF AN EMBODIMENT

In the following, an embodiment of the invention will be described in further details with reference to the drawing in which:

FIGS. 3A and 3B illustrate a frame according to the invention forming part of the nacelle;

FIGS. 4-6 illustrates different views of the frame shown in FIGS. 3A and 3B.

Figure 1:
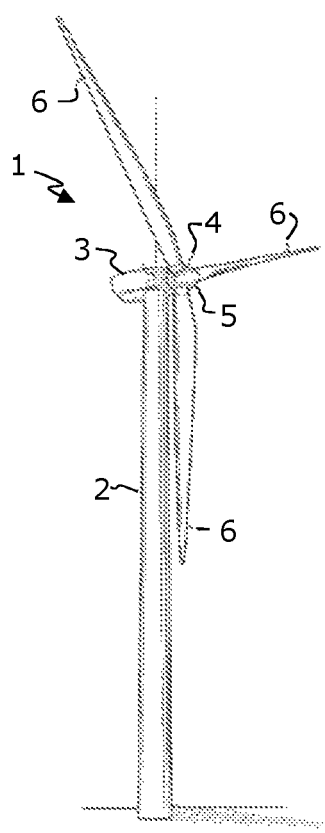
FIG. 1 illustrates a wind turbine.
Figure 2:
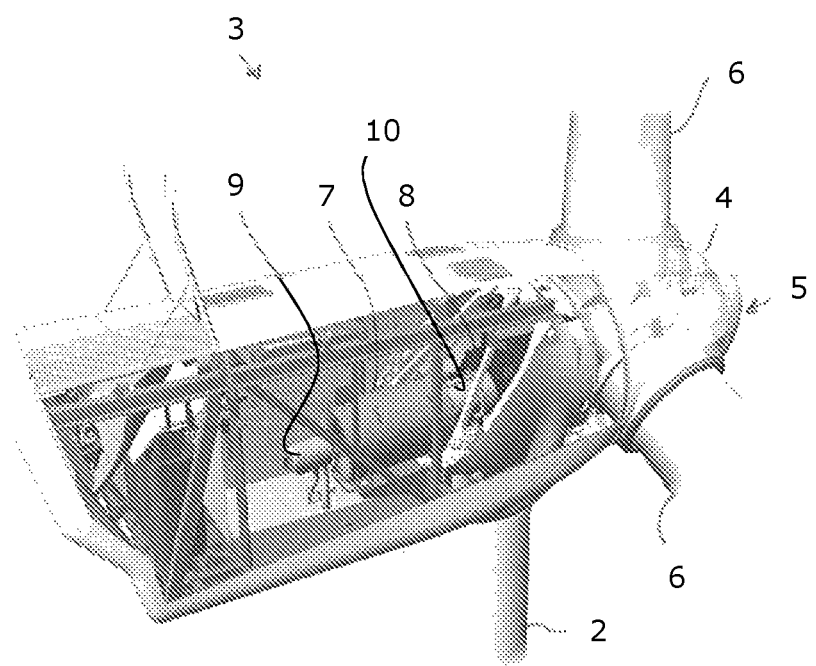
FIG. 2 illustrates the interior of a nacelle.

FIG. 1 illustrates a wind turbine 1 comprising a tower 2, a nacelle 3, a rotor 4 with a spinner 5 and blades 6. The nacelle is shown partly opened in FIG. 2 illustrating that the nacelle is carrying a frame holding a generator 7 and the main bearing 8 for the drive shaft 9, and various electronic components 10.

The frame 11 is illustrated in FIGS. 3-6. The frame comprises a first beam 12 and a second beam 13. The first and second beam extends essentially in parallel in a lengthwise direction indicated by the arrow 14. The frame further comprises a transversely extending third beam 15 extending in a transverse direction, in this case perpendicular, to the lengthwise direction. The third beam 15 is attached to the first and second beams in first and second joints 16, 17.

The third beam forms a foundation for a component such as a generator and it is thereby configured to carry the load of that component.

The first and second beams 12, 13 are stiffened by a cross-shaped structure 18. The cross-shaped structure comprises four legs 19-22 which are connected to a center element 23 via a bolt connection. In their opposite ends, the four legs 19-22 are attached to the first and second beams at positions such that two legs are attached on opposite sides of the first and second joint on each of the first and second beams, respectively.

The cross-shaped structure extends through an opening 24 in the third beam to thereby not touch the third beam. Accordingly, the cross-shaped structure is decoupled from the third beam. Accordingly, each of the third beam and the cross-shaped structure can move without being influenced by the other one of the third beam and the cross-shaped structure. Accordingly, there is no transfer of load between the cross-shaped structure and the third beam.

Figure 5:
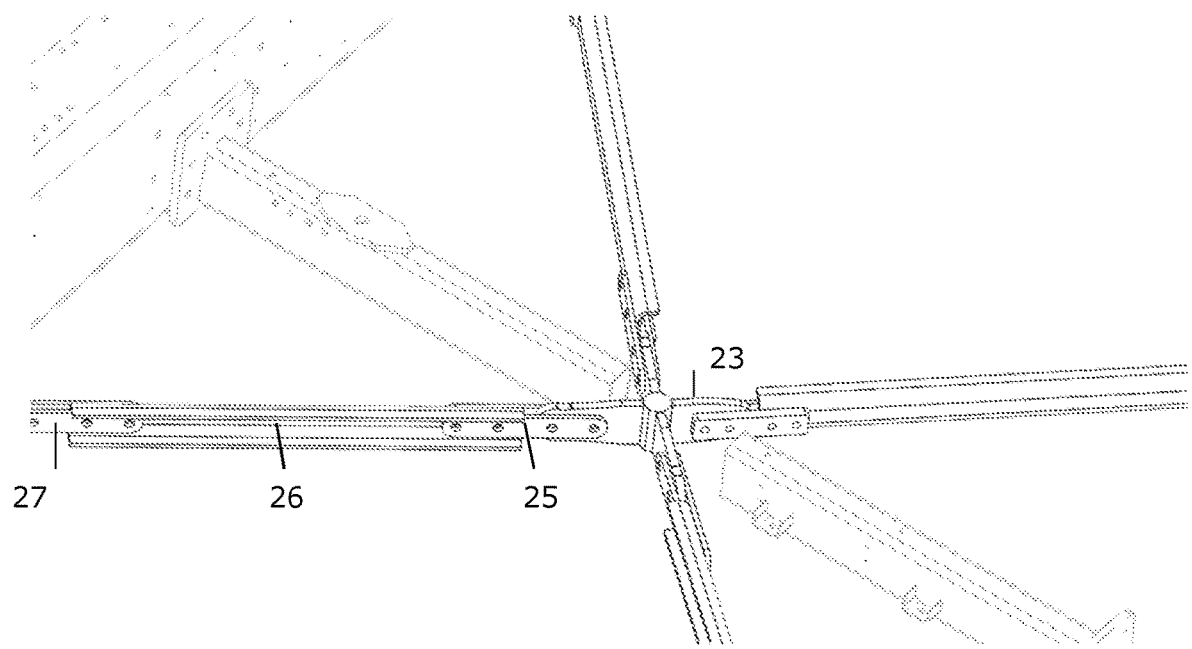

FIG. 5 illustrates that the cross-shaped structure is assembled from a plurality of separate elements assembled by bolts or rivets. Particularly, it comprises a centre element 23 and the four legs 19-22. The four legs are each assembled from three separate elements, a joint element 25 joining the centre element, a central element 26 and an end 27. The ends 27 are connected to the first and second beams.

These multiple separate components making the cross-shaped structure facilitate an easier assembly when the cross-shaped structure is arranged through a hole in the third beam, and it enables assembly or disassembly without affecting the third beam. Accordingly, the cross-shaped structure can be removed and replaced without removing the component which is carried by the third beam.

The third beam is also assembled from separate beam elements. FIGS. 3-6 illustrate three main components of the third beam. At a right side of the frame, the third beam comprises a right-side element 28 attached at the first joint to the first beam by a first flange 29 and forming in its opposite end a second flange 30. The intermediate component 31 comprises a second flange 32 which is bolted to the first flange. At its opposite end, the intermediate component extends over the left-side element 33 and thus facilitate sliding and adjustment of the length of the third beam. The left-side element is attached at the second joint to the second beam by the third flange 34. The splitting of the third beam into separate components facilitates length adjustment and an easier assembly. Particularly, it enables removal of the third beam without influencing the cross-shaped structure and thus without reducing the stiffness of the frame.

Figure 6:
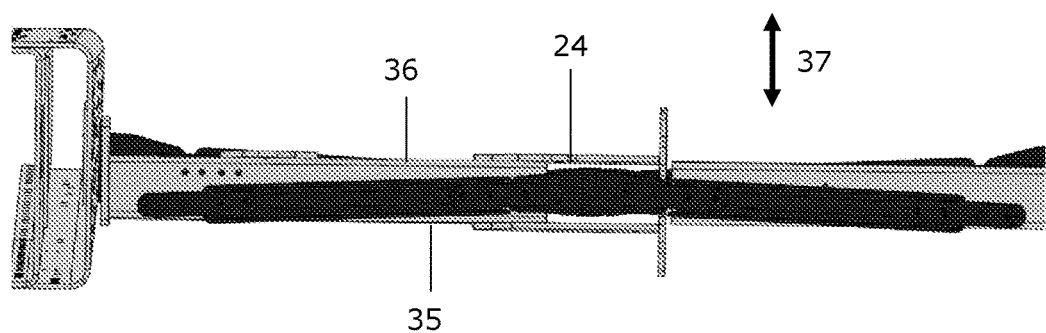

FIG. 6 illustrates a side-view of the frame. This view clearly shows the opening 24 in the third beam, through which the cross-shaped structure extends. The third beam extends between upper edge 35 and a lower edge 36 in a height direction illustrated by the arrow 37 and being perpendicular to the lengthwise direction and perpendicular to the transverse direction. FIG. 6 clearly shows how the cross-shaped structure crosses the third beam at a junction between the upper and lower edges 35, 36.

FIG. 6 further illustrates that the size of the third beam in the height direction is larger than the size of the cross-shaped structure in the height direction and that the size of the first and second beam in the height direction is larger than the size of the third beam in the height direction.

Figure 7:
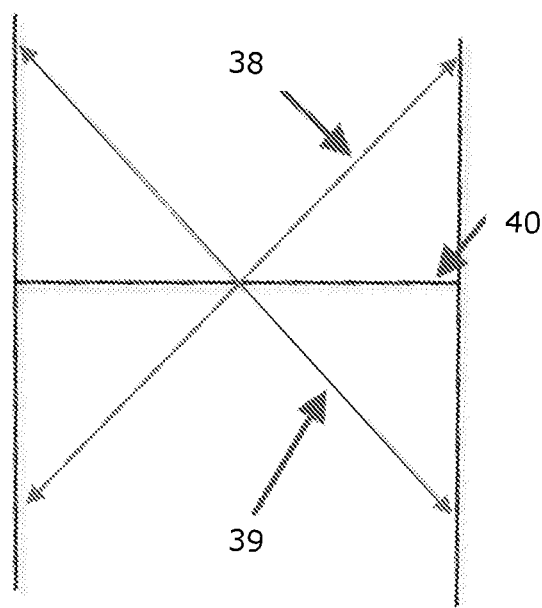
FIG. 7 schematically illustrates the frame.

FIG. 7 illustrates schematically the effect of the cross-shaped structure and the third beam. The two cross bars 38, 39 of the cross-shaped structure are stressed members, and they are structurally decoupled from the transverse third beam 40

The invention claimed is:

1. A frame for carrying a load in a wind turbine, the frame comprising:

a first beam and a second beam, each of the first and second beams extending in a lengthwise direction, a third beam extending in a transverse direction between a first joint on the first beam and a second joint on the second beam, the third beam configured for carrying the load, and a stress-inducing cross-shaped structure forming four legs joined at an intersection and extending therefrom towards four ends, wherein the cross-shaped structure intersects the third beam such that two of the four ends are attached on opposite sides of the joint on the first beam and the other two of the four ends are attached on opposite sides of the joint on the second beam;

wherein the cross-shaped structure is decoupled from the third beam, wherein the third beam extends between upper and lower edges in a height direction perpendicular to the lengthwise direction and perpendicular to the transverse direction, the cross-shaped structure crossing the third beam at a junction between the upper and lower edges, and wherein the third beam is assembled from separate beam elements joined at the junction, each beam element having a length less than a transverse distance between the first and second beams.

2. The frame according to claim 1, wherein the cross-shaped structure is not in contact with the third beam.

3. The frame according to claim 1, wherein the cross-shaped structure is configured exclusively to counteract tension.

4. The frame according to claim 1, wherein the third beam forms an opening through which the cross-shaped structure extends.

5. The frame according to claim 1, wherein the intersection is at the junction.

6. The frame according to claim 1, wherein the size of the third beam in the height direction is larger than the size of the cross-shaped structure in the height direction.

7. The frame according to claim 1, wherein the size of the first and second beam in the height direction is larger than the size of the third beam in the height direction.

8. The frame according to claim 1, wherein the cross-shaped structure is assembled from separate structure elements joined at the junction.

9. The frame according to claim 1, wherein the transverse direction is perpendicular to the lengthwise direction.

10. A wind turbine comprising a nacelle carrying a frame according to claim 1, a wind driven rotor, and a drive train which is driven by the rotor, wherein the drive train includes a generator which is carried by the third beam of the frame.

11. The wind turbine according to claim 10, wherein the first and second beams carry a gearbox, a drive shaft bearing, an electronic controller, and/or a power converter.

12. A method of suspending a component in a wind turbine, comprising:
providing the frame according to claim 1;
arranging the component on the third beam; and
allowing the third beam to deflect without influencing the cross-shaped structure.

\* \* \* \* \*